Nov. 3, 1970 — S. T. POOL — 3,537,206
BAIT CASTING CARTRIDGE
Original Filed June 27, 1967
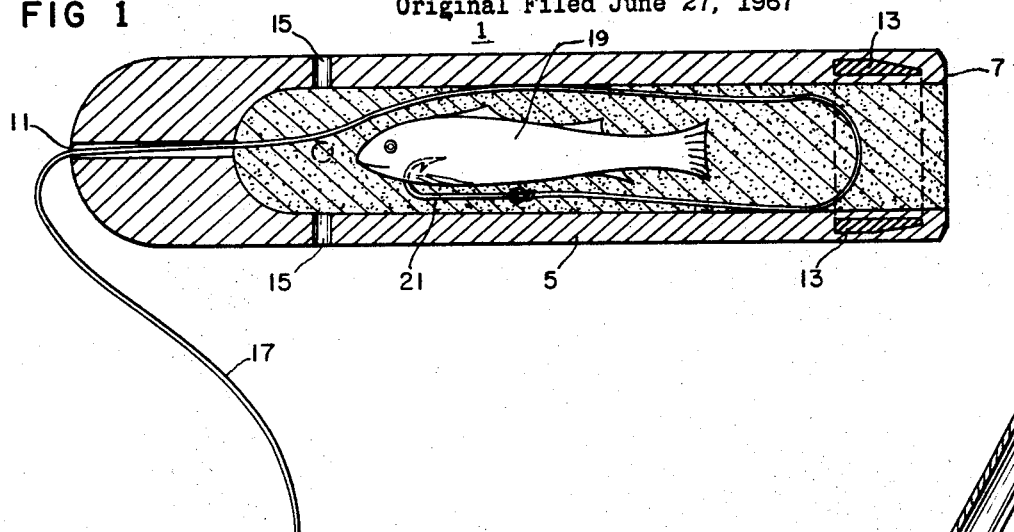
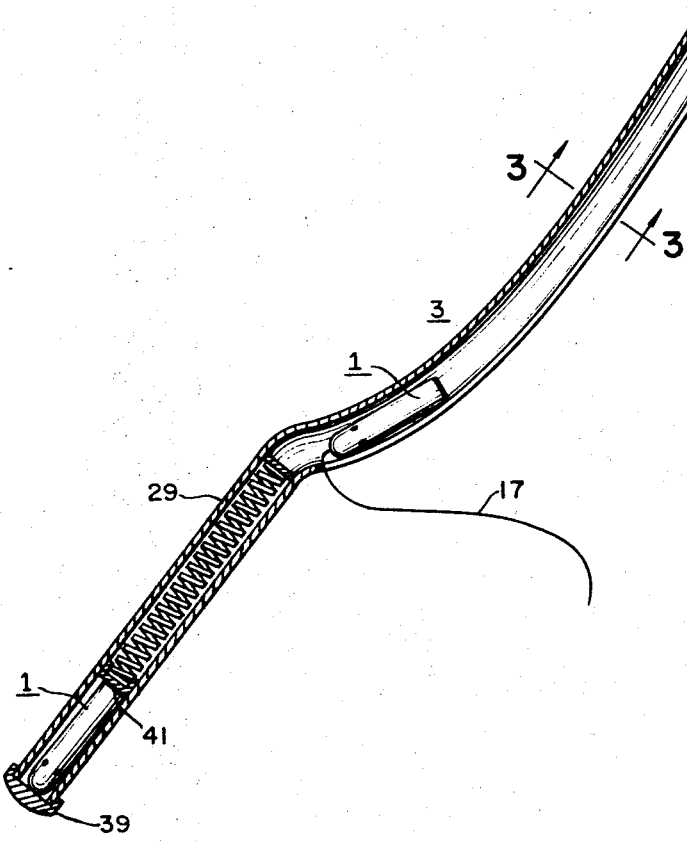
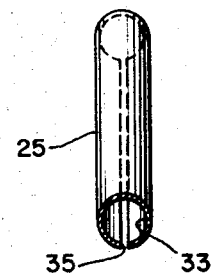
INVENTOR.
SAMUEL T. POOL
BY Edward Brosler
ATTORNEY

United States Patent Office 3,537,206
Patented Nov. 3, 1970

---

3,537,206
BAIT CASTING CARTRIDGE
Samuel T. Pool, Sacramento, Calif.
(P.O. Box 1102, Gonzales, La. 70737)
Original application June 27, 1967, Ser. No. 649,198, now Patent No. 3,494,061, dated Feb. 10, 1970. Divided and this application July 2, 1969, Ser. No. 838,386
Int. Cl. A01k 97/04
U.S. Cl. 43—41.2                                          3 Claims

ABSTRACT OF THE DISCLOSURE

A bait-casting cartridge in which is releasably packed, live, dead, or artificial bait, for attachment to the end of a fishing line stored on the reel of a fishing pole, the cartridge being weighted at its forward end to provide directional stability in flight and proper orientation in water after landing.

---

This application is a division of my application for Bait Casting Assembly, Ser. No. 649,198, filed June 27, 1967, now Pat. No. 3,494,061, granted Feb. 10, 1970.

My invention relates to fishing tackle, and more particularly, to apparatus to be used in conjunction with conventional fishing tackle, to enable casting of light-weight bait for long distances.

In casting light-weight bait, distance is difficult to attain, in spite of the use of long fishing poles; and when fishing from shore, the ability to cast for substantial distances is a practical necessity, and particularly when the water inshore is shallow.

Among the objects of my invention are:

(1) To provide a novel and improved bait cartridge for use with casting means to enable one to cast light-weight bait for long distances;

(2) To provide a novel and improved bait cartridge which has stable directional characteristics in flight, to effect long-distance casting of bait, even though the bait be of light weight;

(3) To provide a novel and improved bait cartridge which protects and preserves live bait during a cast and assures safe release of such bait following impact with the water; and (4) To provide a novel and improved bait cartridge which will assure proper orientation in water, upon completion of flight.

Additional objects of my invention will be brought out in the following description of a preferred embodiment of the same, taken in conjunction with the accompanying drawings, wherein:

FIG. 1 is an enlarged longitudinal view in section through a cartridge, embodying the features of my invention.

FIG. 2 is a longitudinal view in section through a bait-casting device for use with the cartridge of FIG. 1.

FIG. 3 is a view in section taken substantially in the plane 3—3 of FIG. 2.

Referring to the drawings for details of my invention in the preferred form, the cartridge 1 of FIG. 1, has, for one of its primary functions, to increase the effective weight of bait, and impart directional stability in flight, whereby to permit of the casting of such bait for substantial distances. To attain such distances, I provide a casting device 3 such as depicted in FIG. 2, enabling one to centrifugally cast the cartridge over substantial distances. Such casting device is the subject of the parent application previously identified.

The cartridge is in the form of a hollow tube 5, preferably of molded plastic, or other floatable material, open at one end 7, with the opposite or closed end 9 provided with an axial passage 11 therethrough.

At its open end, the cartridge is weighted, preferably by a concentric or annular metal ring 13 molded into the wall of the tube.

Adjacent the closed end, are wall openings or holes 15 communicating with the interior of the cartridge or cartridge chamber, the specific number, size, or shape of such holes not being critical.

The cartridge is for use with conventional fishing tackle, such as a fishing pole and reel, and when put to use, the cartridge is threaded onto the fishing line 17 with its open end facing away from the pole, on whose reel the line is stored. To the free end of the line, the bait 19 is attached in any conventional manner. If live or dead bait is employed, it will be attached to a hook 21, and if an artificial lure is used, it will be tied to the line.

At this stage, the bait, with some slack line, is packed in the cartridge chamber, wet sand being preferably used for the purpose, primarily because it is apt to be readily available, and, when using live bait, it will permit maintenance of life, at least for the time required in effecting a cast, whereby the live bait will remain alive after entering the water.

When thus packed, the bait, regardless of its light weight, has been effectively increased in weight to a value permitting a casting of the same for substantial distances.

To effect such long casts, I provide the casting device of FIG. 2, preferably in the form of a throwing arm, involving a cartridge holding and guiding channel 25 open at one end 27 to permit discharge of the cartridge, and at its other end terminating in a handle 29 of sufficient length to be grasped by both hands and permit of a wide swing of the device for casting purposes.

The channel is curved along substantially a portion of a spiral, with the portion of smallest radius adjacent the handle, and when thus curved, it provides a centrifugal guide surface 33 against which the cartridge will slide in response to a swing of the throwing arm, the cartridge being thus centrifugally discharged and with great force.

Though the channel may be fabricated from wire or reed, I prefer, from the viewpoint of simplicity and lower cost of manufacture, to form the channel of tubing, either metal or plastic, and include the handle as an integral part thereof. When so formed, a longitudinal slot 35 is provided in the guide wall of the channel, extending from the open end, to a point adjacent the handle, to permit passage of the line 17 and free movement thereof with the cartridge 1 during discharge of such cartridge from the channel.

In loading the cartridge into the casting device, it is inserted through the open end of the channel, with the weighted end facing out, to cause the cartridge to emerge with the weighted end first, which imparts to it, stable directional flight characteristics. Preparatory to a cast, the fishing pole is stabilized with its handle end buried in the shore soil or sand, or otherwise maintained in its upright position. Then, with the cartridge loaded into the casting device, it is discharged to a substantial distance off shore by a sudden swing of the casting arm, in the course of which the fishing line will be withdrawn from the reel. With such apparatus, I have been able to cast light weight bait to distances in excess of two hundred feet.

During a cast, the weight 13 will cause that end of the cartridge to lead, while the wet sand packing serves, as an added function, to seal the weighted end against air flow into the cartridge which might otherwise upset stable flight and cause the cartridge to tumble.

Upon striking the water, the cartridge will float with the weighted end submerged, the weight being preferably though not necessarily, sufficient to bring the holes under water, whereby the penetration of water into the chamber from both ends will loosen and free the sand and release the bait from the cartridge, the slack line enabling the bait to freely exit from the cartridge chamber, and effect additional withdrawal of line from the reel under proper conditions.

The handle 29 is preferably hollow to function as a storage chamber for additional cartridges, which may be of different sizes to accommodate bait of different sizes. When used as a storage chamber, the chamber is closed by a cap 39 and the stored cartridges are stabilized by a spring-biased piston 41.

I claim:

1. A bait casting component for a casting device involving a cartridge holding and guiding channel of substantially circular cross section, said casting component comprising a cylindrical cartridge in the form of a hollow tube of substantially uniform external diameter substantially throughout its length and having an overall specific gravity less than water, said tube being closed at one end and open at its other end, with said closed end having a passage therethrough to slidably receive a fishing line, and said open end having a specific gravity sufficiently greater than water to stabilize said cartridge and contents while in flight and, upon striking the water, to cause said cartridge to float with said open end under water, said hollow tube having at least one side wall opening spaced from said closed end sufficiently to permit inflow of water into said tube to facilitate releasing of any contents of said cartridge when floating in water.

2. A bait casting component in accordance with claim 1 characterized by said hollow tube having a weight at its open end sufficient to stabilize said cartridge and contents in flight with its open end forward, and a plurality of side wall openings to permit inflow of water when said cartridge is floating.

3. A bait casting component in accordance with claim 2, characterized by said tube having a wall of definite thickness and of moldable material and said weight being in the form of a ring of metal molded in said tube wall concentric with the axis of said tube.

References Cited

UNITED STATES PATENTS 2,292,743    8/1942    Cordry _____ 43—41.2

FOREIGN PATENTS 166,487    3/1959    Sweden.

SAMUEL KOREN, Primary Examiner

D. J. LEACH, Assistant Examiner